(12) United States Patent
Kaino et al.

(10) Patent No.: US 12,327,324 B2
(45) Date of Patent: Jun. 10, 2025

(54) IMAGE PROCESSING APPARATUS, IMAGE PROCESSING METHOD, AND PROGRAM

(71) Applicant: Sony Group Corporation, Tokyo (JP)

(72) Inventors: Akihiko Kaino, Kanagawa (JP); Masaki Fukuchi, Tokyo (JP); Tatsuki Kashitani, Tokyo (JP); Kenichiro Ooi, Kanagawa (JP); Jingjing Guo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/591,011

(22) Filed: Feb. 29, 2024

(65) Prior Publication Data

US 2024/0203070 A1 Jun. 20, 2024

Related U.S. Application Data

(63) Continuation of application No. 17/938,957, filed on Sep. 7, 2022, now Pat. No. 11,941,766, which is a
(Continued)

(30) Foreign Application Priority Data

Oct. 27, 2011 (JP) .................. 2011-235749

(51) Int. Cl.
*G06T 19/00* (2011.01)
*G06T 7/70* (2017.01)
(Continued)

(52) U.S. Cl.
CPC .............. *G06T 19/006* (2013.01); *G06T 7/70* (2017.01); *G06T 7/73* (2017.01); *G06T 19/20* (2013.01);
(Continued)

(58) Field of Classification Search
None
See application file for complete search history.

(56) References Cited

U.S. PATENT DOCUMENTS 6,577,249 B1 6/2003 Akatsuka et al.
8,994,645 B1 3/2015 Meehan
(Continued)

FOREIGN PATENT DOCUMENTS

JP 2003-256876 A 9/2003
JP 2005-010998 A 1/2005
(Continued)

OTHER PUBLICATIONS

M. Zendjebil, et al., "Hybrid Localization System for Mobile Outdoor Augmented Reality Applications", IEEE, Image Processing Theory, Tools & Applications, Nov. 23, 2008, XP031404004, pp. 1-6.
(Continued)

*Primary Examiner* — James A Thompson
(74) *Attorney, Agent, or Firm* — XSENSUS LLP

(57) ABSTRACT

An information processing system that acquires video data captured by an image pickup unit; detects an object from the video data; detects a condition corresponding to the image pickup unit; and controls a display to display content associated with the object at a position other than a detected position of the object based on the condition corresponding to the image pickup unit.

21 Claims, 13 Drawing Sheets

Related U.S. Application Data continuation of application No. 17/140,144, filed on Jan. 4, 2021, now Pat. No. 11,468,647, which is a continuation of application No. 16/587,070, filed on Sep. 30, 2019, now Pat. No. 10,902,682, which is a continuation of application No. 16/051,893, filed on Aug. 1, 2018, now Pat. No. 10,453,266, which is a continuation of application No. 15/459,711, filed on Mar. 15, 2017, now Pat. No. 10,068,382, which is a continuation of application No. 14/994,950, filed on Jan. 13, 2016, now Pat. No. 9,626,806, which is a continuation of application No. 13/824,140, filed as application No. PCT/JP2012/005582 on Sep. 4, 2012, now Pat. No. 9,292,974.

(51) Int. Cl.
  G06T 7/73     (2017.01)
  G06T 19/20    (2011.01)
  H04N 7/18     (2006.01)

(52) U.S. Cl.
  CPC ... *H04N 7/183* (2013.01); *G06T 2207/10021* (2013.01); *G06T 2207/30244* (2013.01); *G06T 2219/004* (2013.01)

(56) References Cited

U.S. PATENT DOCUMENTS

| | | | |
|---|---|---|---|
| 10,902,682 | B2 | 1/2021 | Kaino et al. |
| 11,468,647 | B2 | 10/2022 | Kaino et al. |
| 11,941,766 | B2 * | 3/2024 | Kaino ............... G06T 7/70 |
| 2004/0046779 | A1 | 3/2004 | Asano et al. |
| 2005/0234333 | A1 | 10/2005 | Takemoto et al. |
| 2008/0100620 | A1 | 5/2008 | Nagai et al. |
| 2008/0285854 | A1 | 11/2008 | Kotake et al. |
| 2010/0287511 | A1 | 11/2010 | Meier et al. |
| 2010/0329513 | A1 | 12/2010 | Klefenz |
| 2011/0081048 | A1 | 4/2011 | Woo et al. |
| 2011/0090252 | A1 | 4/2011 | Yoon et al. |
| 2011/0115816 | A1 | 5/2011 | Brackney |
| 2011/0169861 | A1 | 7/2011 | Suzuki et al. |
| 2011/0304640 | A1 | 12/2011 | Noge |
| 2011/0305368 | A1 | 12/2011 | Osako |
| 2012/0033077 | A1 | 2/2012 | Kitaura et al. |
| 2012/0050326 | A1 | 3/2012 | Tanaka |
| 2012/0124509 | A1 | 5/2012 | Matsuda et al. |
| 2012/0142415 | A1 | 6/2012 | Lindsay |
| 2012/0195460 | A1 | 8/2012 | Lawrence Ashok Inigo |
| 2012/0218299 | A1 | 8/2012 | Hayakawa |
| 2012/0219179 | A1 | 8/2012 | Osako |
| 2012/0309529 | A1 | 12/2012 | Westlund et al. |
| 2012/0320088 | A1 | 12/2012 | Ihara et al. |
| 2013/0100165 | A1 | 4/2013 | Komiyama |

FOREIGN PATENT DOCUMENTS

| | | |
|---|---|---|
| JP | 2006-072667 A | 3/2006 |
| JP | 2008-046806 A | 2/2008 |
| JP | 2009-271822 A | 11/2009 |
| JP | 2010-170316 A | 8/2010 |
| JP | 2010-238096 A | 10/2010 |
| JP | 2010-238098 A | 10/2010 |
| JP | 2010-541053 A | 12/2010 |
| JP | 2011-159300 A | 8/2011 |
| JP | 2011-203824 A | 10/2011 |
| JP | 2011-204047 A | 10/2011 |
| JP | 2012-033073 A | 2/2012 |
| WO | 2010/094065 A1 | 8/2010 |
| WO | 2011/122654 A1 | 10/2011 |

OTHER PUBLICATIONS

Extended European Search Report Dated Jan. 14, 2020, issued in corresponding European Patent Application No. 19192647.6, 16 pages.
Shin et al., Unified Context-aware Augmented Reality Application Framework for User-Driven Tour Guides, 2010 International Symposium on Ubiquitous Virtual Reality, 4 pages.
Harviainen et al., Camera-based Interactions for Augmented Reality, VTT Technical Research Centre of Finland, pp. 307-310.
Mendez et al., Context Sensitive Stylesheets for Scene Graphs, The International Journal of Virtual reality, 2008, 7(2): 1-6, 9 pages.
Henrysson et al: "Mobile phone based AR scene assembly", Proceedings of the 4th international conference on Mobile and ubiquitous multimedia, MUM '05, Jan. 2005, pp. 95-102, XP055026944.
Koiso et al: "InfoLOD and landmark: spatial presentation of attribute information and computing representative Objects for spatial data", International Journal of Cooperative Information Sys, vol. 9, No. 12, Mar. 2000, pp. 53-75, XP009105830.
EP Brief Communication dated Jan. 23, 2019, issued in corresponding EP Patent Application No. 12842910.
Extended European Search Report issued Aug. 3, 2015 in European Patent Application No. 12842910.7.
Wagner, "Building Wide-Area Applications with the AR Toolkit," Augmented Reality Toolkit, The First IEEE International Workshop, Piscataway, New Jersey, USA, Sep. 29, 2002, pp. 23-29, XP010620333.
Ledermann, et al., "Dynamically Shared Optical Tracking, "Augmented Reality Toolkit, The First IEEE International Workshop, Piscataway, New Jersey, USA, Sep. 29, 2002, pp. 76-83, XP010620356.
Abawi et al., "Accuracy in Optical Tracking with Fiducial Markers: An Accuracy Function for ARToolKit," Proceedings of the third IEEE and ACM International Symposium on Mixed and Augmented Reality, Nov. 2-5, 2004, Arlington, VA, USA, pp. 260-261, XP010769708.
Davidson, Institute of Electrical and Electronics Engineers: "Real-Time Simultaneous Localisation and Mapping with Single Camera," Proceedings of the Eight IEEE International Conference on Computer Vision (ICCV), Oct. 13-16, 2003 Nice, France, pp. 1403-1410, SP010662556.
Bay et al., "Speeded-Up Robust Features (SURF)," Computer Vision and Image Understanding, Academic Press, US, vol. 110, No. 3, Jun. 1, 2008, pp. 346-359, XP022652944.
Ozuysal, et al., "Fast Keypoint Recognition Using Random Ferns," Transactions on Pattern Analysis and Machine Intelligence, IEEE Service Center, Los Alamitos, California, USA, vol. 30, No. 3, Mar. 1, 2010, pp. 448-461; XP011293042.
Combined Office Action and Search Report issued Jan. 27, 2016 in Chinese Patent Application No. 201280004215.X.
Office Action issued Aug. 2, 2016 in Japanese Patent Application No. 2015-196640.
Japanese Office Action dated Jan. 31, 2017, issued in Japanese Patent Application No. 2015-196640.
European Brief Communications regarding "The request for oral proceedings and summons to attend oral proceedings" which is canceled issued May 24, 2018 in Application No. 12842910.7-1230/ 2638527, 13 pages.
Martin Wagner; "Building Wide-Area Applications with the AR Toolkit"; Technische Universitat Munchen, Institut fuer Informatik, Boltzmannstrasse 3, 85748 Graching bei Muenchen, Germany, 8 pages.

\* cited by examiner

132
| TIME | CAMERA POSITION | CAMERA POSTURE |
|------|-----------------|----------------|
| t1   | X1              | W1             |
| t2   | X2              | W2             |
| :    | :               | :              |
CAMERA POSITION/POSTURE INFORMATION
Fig. 7
136
| MARKER ID/ATTRIBUTES | MARKER IMAGE |
|----------------------|--------------|
| MARKER ID:M01<br>RELATED CONTENT ID:C01<br>SIZE: (W01,H01) | 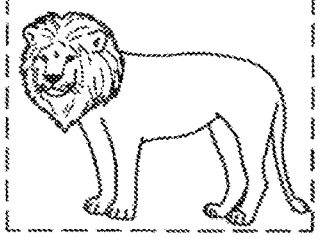 |
| MARKER ID:M02<br>RELATED CONTENT ID:C02<br>SIZE: (W02,H02) | 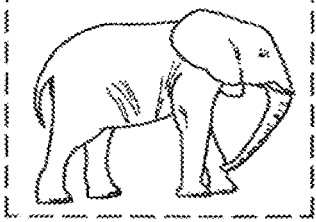 |
| : | : |
MARKER BASIC INFORMATION
Fig. 8

137

| MARKER ID | POSITION | POSTURE | DETECTION TIME | LOST TIME |
|---|---|---|---|---|
| M01 | x1 | w1 | D1 | L1 |
| M02 | x2 | w2 | D2 | |
| : | : | : | : | : |

MARKER DETECTION INFORMATION

Fig. 9

IMAGE PROCESSING APPARATUS, IMAGE PROCESSING METHOD, AND PROGRAM

CROSS-REFERENCE TO RELATED APPLICATIONS

This application is a continuation of U.S. application Ser. No. 17/938,957 filed Sep. 7, 2022, which is a continuation of U.S. application Ser. No. 17/140,144 filed Jan. 4, 2021 (now U.S. Pat. No. 11,468,647), which is a continuation of U.S. application Ser. No. 16/587,070 filed Sep. 30, 2019 (now U.S. Pat. No. 10,902,682), which is a continuation of U.S. application Ser. No. 16/051,893, filed Aug. 1, 2018 (now U.S. Pat. No. 10,453,266), which is a continuation of U.S. application Ser. No. 15/459,711, filed Mar. 15, 2017 (now U.S. Pat. No. 10,068,382), which is a continuation of U.S. application Ser. No. 14/994,950, filed Jan. 13, 2016 (now U.S. Pat. No. 9,626,806), which is a continuation of U.S. application Ser. No. 13/824,140, filed Jun. 10, 2013 (now U.S. Pat. No. 9,292,974), which is a National Stage of PCT/JP2012/005582, filed Sep. 4, 2012, which claims priority under 35 U.S.C. 119 to Japanese Application No. 2011-235749, filed Oct. 27, 2011, the entire contents of each are incorporated herein by reference.

TECHNICAL FIELD

The present disclosure relates to an image processing apparatus, an image processing method, and a program.

BACKGROUND ART

In recent years, attention has been focused on a technology called augmented reality (AR) that presents virtual content to the user by overlaying such content onto a real space. The content presented to the user by AR technology may be visualized in a variety of forms, such as text, icons, and animations.

In AR technology, content to be overlaid on an image may be selected according to a variety of criteria. One of such criteria is recognition of an object associated in advance with content. As one example, JP2010-170316A discloses a technique that detects a marker, which is an object on which a specified pattern is drawn, in an image and overlays content associated with the detected marker at the detected position of the marker.

CITATION LIST

Patent Literature

[PTL 1]
JP 2010-170316A

SUMMARY

Technical Problem

However, with an AR technique based on the detection of markers as described above, it is normally difficult to continue the displaying of AR content once a marker has been lost from the image. Also, even if the displaying of AR content were continued after a marker was lost from the image, there would be a tendency for the displaying of AR content to not reflect the state of the real space and therefore appear unnatural.

Accordingly, it would be desirable to realize an arrangement capable of continuing the displaying of AR content in a natural state even after an object that acts as a marker has been lost from the image.

Solution to Problem

According to an embodiment of the present disclosure, there is provided an information processing system comprising: one or more processing units that: acquire video data captured by an image pickup unit; detect an object from the video data; detect a condition corresponding to the image pickup unit; and control a display to display content associated with the object at a position other than a detected position of the object based on the condition corresponding to the image pickup unit.

According to another embodiment of the present disclosure, there is provided an information processing method performed by an information processing system, the method comprising: acquiring video data captured by an image pickup unit; detecting an object from the video data; detecting a condition corresponding to the image pickup unit; and controlling a display to display content associated with the object at a position other than a detected position of the object based on the condition corresponding to the image pickup unit.

According to still another embodiment of the present disclosure, there is provided a non-transitory computer-readable medium including computer program instructions, which when executed by an information processing system, cause the information processing system to perform a method, the method comprising: acquiring video data captured by an image pickup unit; detecting an object from the video data; detecting a condition corresponding to the image pickup unit; and controlling a display to display content associated with the object at a position other than a detected position of the object based on the condition corresponding to the image pickup unit.

Advantageous Effects of Invention

According to the above embodiments of the present disclosure, an arrangement capable of continuing the displaying of AR content in a natural state even after an object that acts as a marker has been lost from the image is realized.

BRIEF DESCRIPTION OF DRAWINGS

FIG. 7 is a diagram useful in explaining one example of the configuration of camera position/posture information.

FIG. 8 is a diagram useful in explaining one example of the configuration of marker basic information.

FIG. 9 is a diagram useful in explaining one example of the configuration of marker detection information.

DESCRIPTION OF EMBODIMENTS

Figure 1:
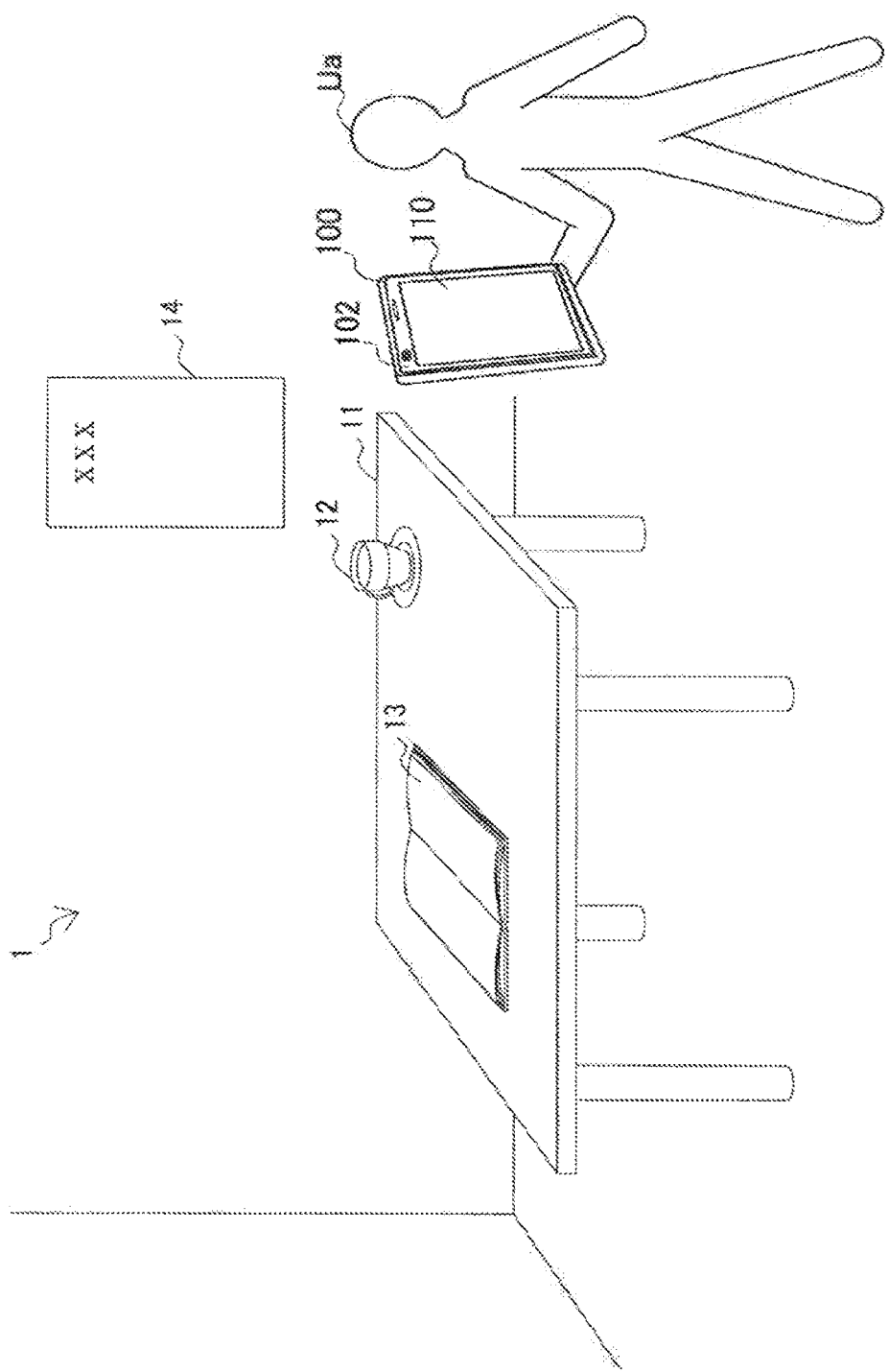
FIG. 1 is a diagram useful in explaining an overview of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
1. Overview
2. Example Configuration of Image Processing Apparatus According to Embodiment of the Present Disclosure
    2-1. Hardware Configuration
    2-2. Functional Configuration
    2-3. Example Displaying of AR Content
    2-4. Flow of Processing
3. Conclusion

1. OVERVIEW

First, an overview of an image processing apparatus according to an embodiment of the present disclosure will be described with reference to FIGS. 1 to 2B.

FIG. 1 is a diagram useful in explaining an overview of an image processing apparatus 100 according to an embodiment of the present disclosure. FIG. 1 shows the image processing apparatus 100 in the possession of the user Ua. The image processing apparatus 100 is equipped with an image pickup unit 102 (hereinafter sometimes referred to simply as the "camera") that picks up images of a real space 1 and a display unit 110. In the example in FIG. 1, a table 11, a coffee cup 12, a book 13, and a poster 14 are present in the real space 1. The image pickup unit 102 of the image processing apparatus 100 picks up a series of images that compose video images produced by image pickup of the real space 1. The image processing apparatus 100 then carries out image processing with an image picked up by the image pickup unit 102 as an input image to generate an output image. In the present embodiment, the output image is typically generated by overlaying virtual content (hereinafter referred to as "AR content") for augmented reality (AR) onto the input image. The display unit 110 of the image processing apparatus 100 successively displays the generated output images. Note that the real space 1 shown in FIG. 1 is merely one example. The input image processed by the image processing apparatus 100 may be any image in which a real space appears.

The provision of AR content by the image processing apparatus 100 may start with detection of a marker appearing in an input image as a trigger. In this specification, the term "marker" typically refers to any kind of object present in the real space that has a known pattern. That is, the term "marker" may include a shape, symbol, character string or design shown on a real object, part of a real object, or the surface of a real object, or an image or the like displayed on a display. Although there are cases where as a narrow definition, the term "marker" refers to a special object provided for some kind of application, the technology according to the present disclosure is not limited to such a definition.

Note that in FIG. 1, a smartphone is shown as one example of the image processing apparatus 100. However, the image processing apparatus 100 is not limited to this example. As examples, the image processing apparatus 100 may be a PC (Personal Computer), a PDA (Personal Digital Assistant), a game console, a PND (Portable Navigation Device), a content player, or a digital home appliance.

Figure 2A:
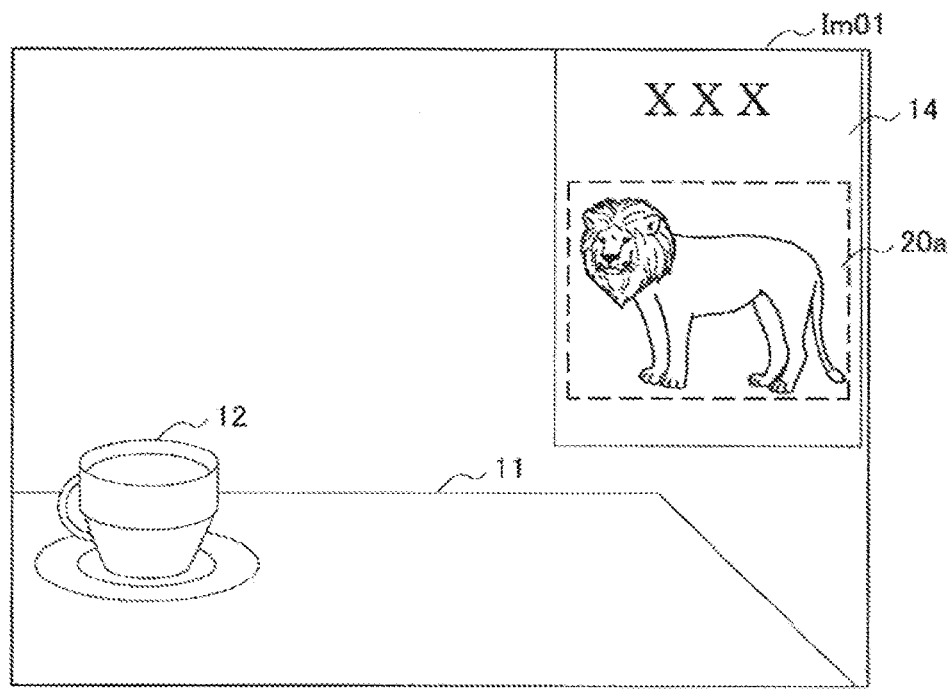
FIG. 2A is a diagram useful in explaining one example of a marker that can be detected by the present embodiment.

FIG. 2A is a diagram useful in explaining one example of a marker that can be detected in the present embodiment. FIG. 2A shows an input image Im01 as one example that can be acquired by the image processing apparatus 100 illustrated in FIG. 1. The table 11, the coffee cup 12, and the poster 14 appear in the input image Im01. A marker 20a that is a known design is printed on the poster 14. If the image processing apparatus 100 detects such a marker 20a in the input image Im01, content associated with the marker 20a may be overlaid on the input image Im01.

Figure 2B:
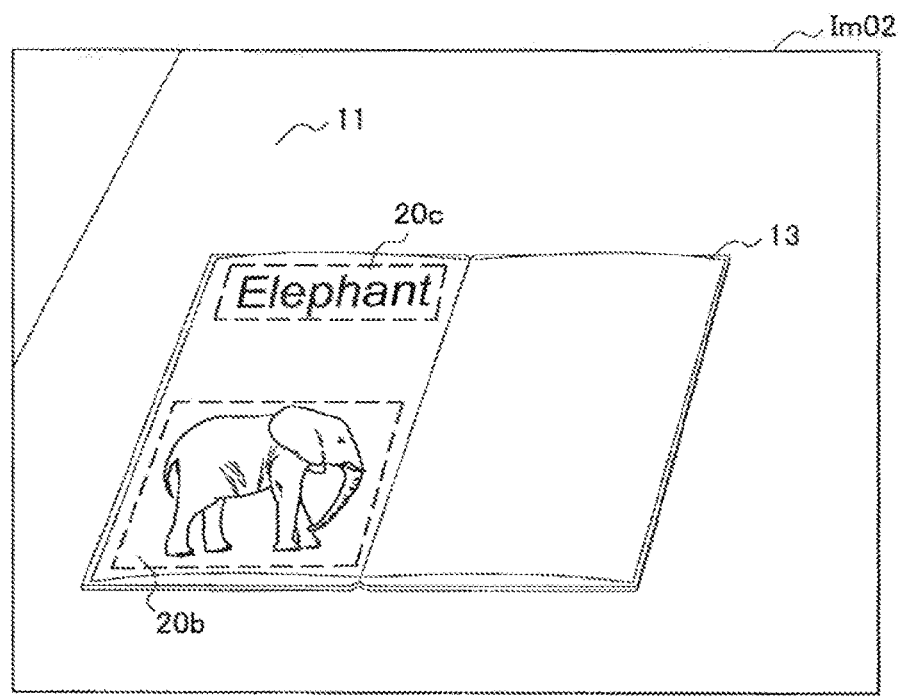
FIG. 2B is a diagram useful in explaining another example of a marker that can be detected by the present embodiment.

FIG. 2B is a diagram useful in explaining another example of a marker that may be detected in the present embodiment. FIG. 2B shows an input image Im02. The table 11 and the book 13 appear in the input image Im02. A marker 20b that is a known design is printed on the book 13. If the image processing apparatus 100 detects such a marker 20b in the input image Im02, content associated with the marker 20b may be overlaid on the input image Im02. In place of the marker 20b illustrated in FIG. 2B, the image processing apparatus 100 may use a marker 20c that is a known character string.

After a marker has been detected in the input image as described above, in some cases the marker will stop being detected from the input image due to the camera moving or the posture of the camera changing. In such case, with typical AR technology that is based on the detection of markers, it is difficult to continue displaying the AR content. If the displaying of AR content is continued even after a marker has been lost, the display will become unnatural, such as by having AR content displayed that is unrelated to the position or posture of the marker.

For this reason, in the present embodiment, to eliminate or reduce the unnatural displaying of AR content, the image processing apparatus 100 tracks the position and posture of the camera in the three-dimensional real space and manages the positions and postures of the detected markers using a database. As described in detail later, the image processing apparatus 100 then controls the behavior of AR content based on at least one of the position and posture of the camera relative to the markers.

2. EXAMPLE CONFIGURATION OF IMAGE PROCESSING APPARATUS ACCORDING TO AN EMBODIMENT

2-1. Hardware Configuration

Figure 3:
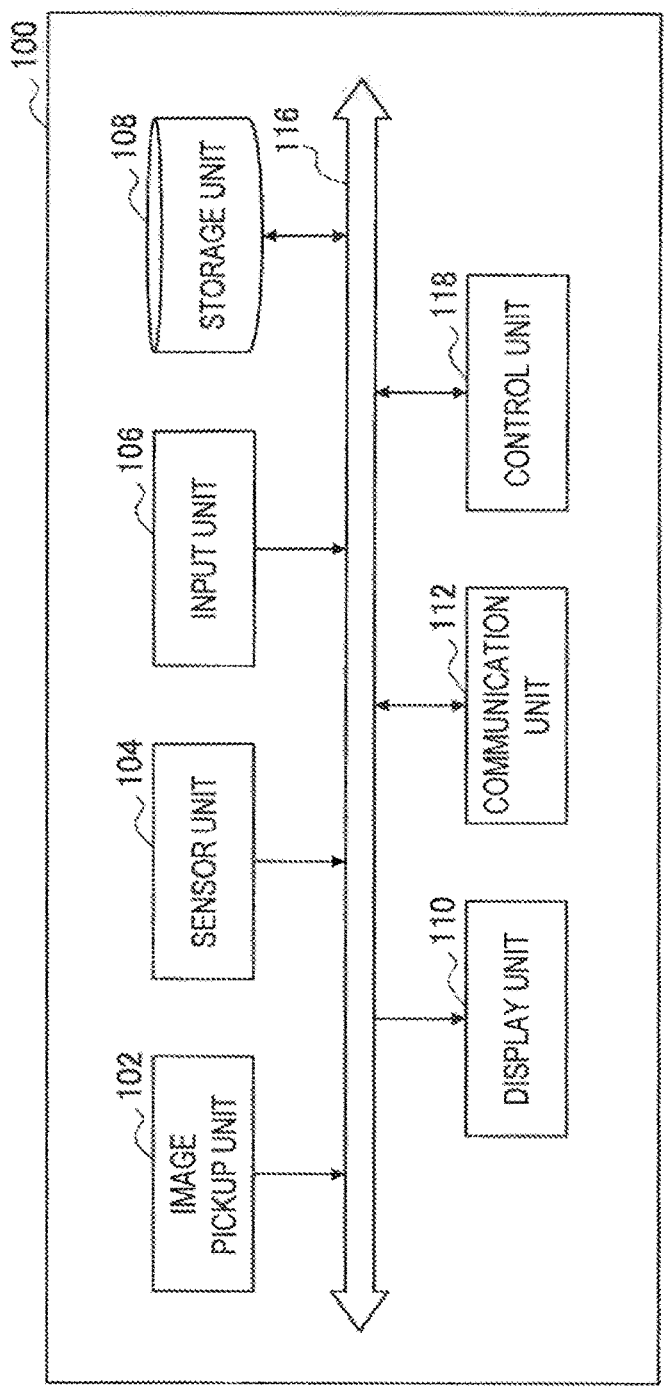
FIG. 3 is a block diagram showing one example of the hardware configuration of the information processing apparatus according to the present embodiment.

FIG. 3 is a block diagram showing one example of the hardware configuration of the image processing apparatus 100 according to the present embodiment. As shown in FIG. 3, the image processing apparatus 100 includes the image pickup unit 102, a sensor unit 104, an input unit 106, a storage unit 108, a display unit 110, a communication unit 112, a bus 116, and a control unit 118.

(1) Image Pickup Unit

The image pickup unit 102 is a camera module that picks up an image. The image pickup unit 102 picks up images of a real space using an image pickup element such as a CCD (Charge Coupled Device) or a CMOS (Complementary Metal Oxide Semiconductor) to generate a picked-up image. A series of the picked-up images generated by the image pickup unit 102 compose video images in which the real space appears. Note that the image pickup unit 102 does not need to be part of the image processing apparatus 100. As one example, an image pickup apparatus connected to the image processing apparatus 100 wirelessly or using wires may be treated as the image pickup unit 102.

(2) Sensor Unit

The sensor unit 104 may include a variety of sensors such as a positioning sensor, an acceleration sensor, and a gyrosensor. The position, posture, or movement of the image processing apparatus 100 that can be measured by the sensor unit 104 may be used for a variety of applications such as supporting recognition of the position and posture of a camera, described later, acquisition of data that specifies a global position, or recognition of instructions from the user. Note that the sensor unit 104 may be omitted from the configuration of the image processing apparatus 100.

(3) Input Unit

The input unit 106 is an input device used by the user to operate the image processing apparatus 100 or to input information into the image processing apparatus 100. As one example, the input unit 106 may include a touch sensor that detects touches made by the user on the screen of the display unit 110. In place of (or in addition to) this, the input unit 106 may include a pointing device such as a mouse or a touch pad. In addition, the input unit 106 may include another type of input device such as a keyboard, a keypad, a button or buttons, or a switch or switches.

(4) Storage Unit

The storage unit 108 is constructed of a storage medium such as a semiconductor memory or a hard disk drive and stores programs and data for processing by the image processing apparatus 100. The data stored by the storage unit 108 may include picked-up image data, sensor data, and data in a variety of databases (DB), described later. Note that instead of being stored in the storage unit 108, some of the programs and data described in the present specification may be acquired from an external data source (as examples, a data server, network storage, or an external memory).

(5) Display Unit

The display unit 110 is a display module including a display such as an LCD (Liquid Crystal Display), an OLED (Organic Light-Emitting Diode), or a CRT (Cathode Ray Tube). As one example, the display unit 110 is used to display an output image generated by the image processing apparatus 100. Note that the display unit 110 also does not need to be part of the image processing apparatus 100. As one example, a display apparatus connected to the image processing apparatus 100 wirelessly or using wires may be treated as the display unit 110.

(6) Communication Unit

The communication unit 112 is a communication interface that serves as a mediator for communication by the image processing apparatus 100 with other apparatuses. The communication unit 112 supports an arbitrary wireless communication protocol or wired communication protocol and establishes a communication connection with other apparatuses.

(7) Bus

The bus 116 connects the image pickup unit 102, the sensor unit 104, the input unit 106, the storage unit 108, the display unit 110, the communication unit 112, and the control unit 118 to one another.

(8) Control Unit

The control unit 118 corresponds to a processor such as a CPU (Central Processing Unit) or a DSP (Digital Signal Processor). By executing a program stored in the storage unit 108 or another storage medium, the control unit 118 causes the image processing apparatus 100 to function in a variety of ways as described later.

2-2. Functional Configuration

Figure 4:
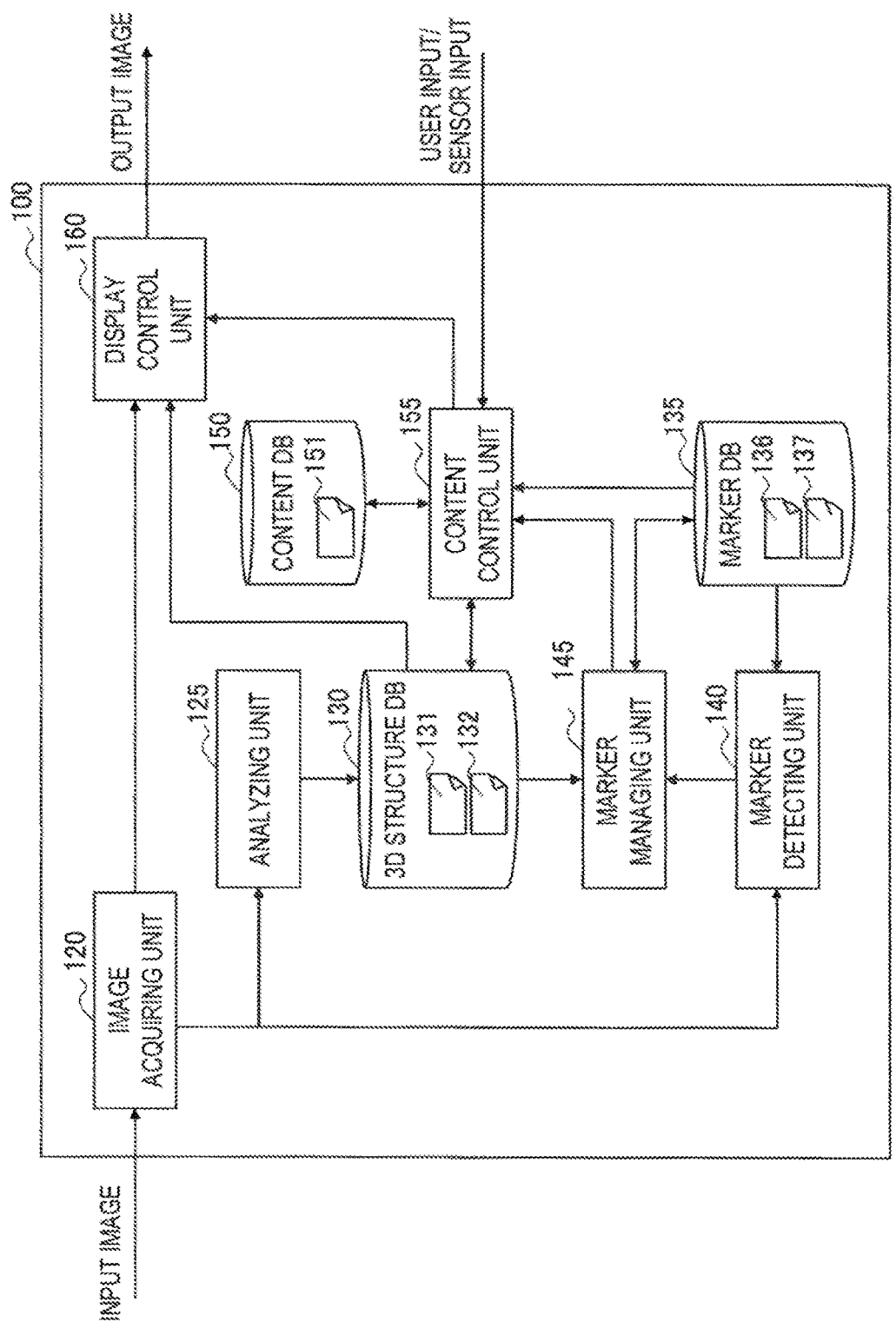
FIG. 4 is a block diagram showing one example of the logical functional configuration of the information processing apparatus according to the present embodiment.

FIG. 4 is a block diagram showing one example of a logical functional configuration realized by the storage unit 108 and the control unit 118 of the image processing apparatus 100 shown in FIG. 3. As shown in FIG. 4, the image processing apparatus 100 includes an image acquiring unit 120, an analyzing unit 125, a three-dimensional (3D) structure database (DB) 130, a marker DB 135, a marker detecting unit 140, a marker managing unit 145, a content DB 150, a content control unit 155, and a display control unit 160.

(1) Image Acquiring Unit

The image acquiring unit 120 acquires the picked-up image generated by the image pickup unit 102 as an input image. The input image acquired by the image acquiring unit 120 may be an individual frame that composes video images produced by image pickup of a real space. The image acquiring unit 120 outputs the acquired input image to the analyzing unit 125, the marker detecting unit 140, and the display control unit 160.

(2) Analyzing Unit

The analyzing unit 125 analyzes the input image inputted from the image acquiring unit 120 to recognize the three-dimensional position and posture in the real space of the apparatus that picked up the input image. The analyzing unit 125 also recognizes the three-dimensional structure of the peripheral environment of the image processing apparatus 100 and stores the recognized three-dimensional structure in the 3D structure DB 130. In the present embodiment the analyzing process performed by the analyzing unit 125 is carried out according to SLAM (Simultaneous Localization And Mapping). The fundamental principles of SLAM are disclosed in "Real-Time Simultaneous Localization and Mapping with a Single Camera" (Andrew J. Davison, Proceedings of the 9$^{th}$ IEEE International Conference on Computer Vision Volume 2, 2003, pp. 1403-1410). Note that the present disclosure is not limited to this example and the analyzing unit 125 may analyze the input image using any other three-dimensional environment recognition technique.

Figures 5, 6:
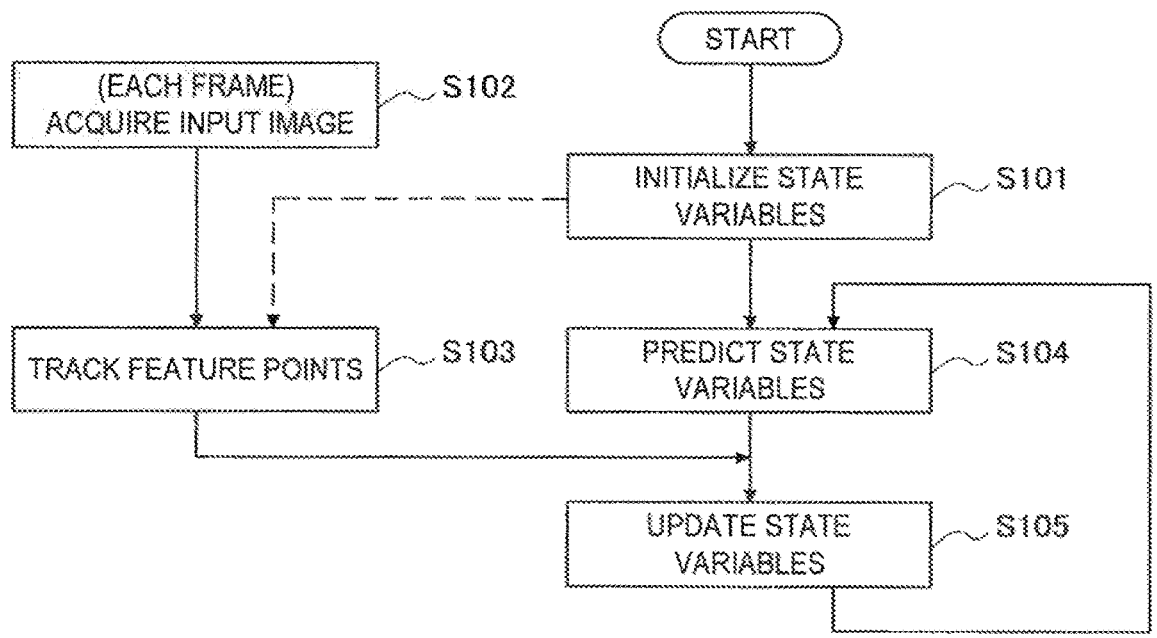
FIG. 5 is a flowchart showing one example of the flow of an analyzing process according to an analyzing unit illustrated in FIG. 4.
FIG. 6 is a diagram useful in explaining one example of the configuration of feature point information.

One characteristic of SLAM is that it is possible to dynamically recognize the three-dimensional structure of a real space appearing in an input image from a single (monocular) camera in parallel with the position and posture of such camera. FIG. 5 shows one example of the analyzing process carried out by the analyzing unit 125.

In FIG. 5, the analyzing unit 125 first initializes state variables (step S101). The state variables initialized here include at least the position and posture (rotational angle) of the camera and the movement speed and angular velocity of the camera, with the three-dimensional position of at least one feature point appearing in the input image also being added to the state variables. Input images acquired by the image acquiring unit 120 are successively inputted into the analyzing unit 125 (step S102). The processing in step S103 to step S105 may be repeated for each input image (that is, for each frame).

In step S103, the analyzing unit 125 tracks the feature points appearing in the input image. For example, the analyzing unit 125 matches a patch (for example, a small image composed of nine pixels in a 3 by 3 grid centered on a feature point) for each feature point included in the state variables against a new input image. The analyzing unit 125 then detects the position of each patch in the input image, that is, the positions of the feature points. The positions of the feature points detected here are used when subsequently updating the state variables.

In step S104, the analyzing unit 125 generates predicted values of the state variables of the next frame, for example, based on a specified prediction model. In step S105, the analyzing unit 125 uses the predicted values of the state variables generated in step S104 and observed values in keeping with the positions of the feature points detected in step S103 to update the state variables. The analyzing unit 125 carries out the processing in step S104 and S105 based on the principles of an extended Kalman filter. Note that such processing is described in detail in JP2011-159163A, for example.

By carrying out such analyzing process, parameters included in the state variables are updated in each frame. The number of feature points included in the state variables may increase or decrease in each frame. That is, if the field of view of the camera changes, parameters of feature points in a region that has newly entered the frame may be added to the state variables and parameters of feature points in a region that has left the frame may be deleted from the state variables.

The analyzing unit 125 stores the position and posture of the camera that are updated in this way for each frame in a time series in the 3D structure DB 130. The analyzing unit 125 also stores the three-dimensional positions of the feature points included in the state variables for SLAM in the 3D structure DB 130. Information on the feature points is gradually accumulated in the 3D structure DB 130 in keeping with movement of the field of view of the camera.

Note that an example where the analyzing unit 125 uses SLAM to recognize both the position and the posture of the image pickup unit 102 is described here. However, the present disclosure is not limited to this example and it is also possible to recognize the position or the posture of the image pickup unit 102 based on sensor data from the sensor unit 104, for example.

(3) 3D Structure DB

The 3D structure DB 130 is a database storing feature point information 131 used in the analyzing process by the analyzing unit 125 and camera position/posture information 132 recognized as the result of the analyzing process.

FIG. 6 is a diagram useful in explaining one example configuration of the feature point information 131. As shown in FIG. 6, the feature point information 131 includes four data items, namely "feature point ID", "position", "patch", and "updated time". The "feature point ID" is an identifier for uniquely identifying each feature point. The "position" is a three-dimensional vector expressing the position of each feature point in the real space. The "patch" is image data of a small image used to detect each feature point in an input image. The "updated time" expresses the time when each record was updated. In the example in FIG. 6, information on the two feature points FP01 and FP02 is shown. However, in reality, information on a larger number of feature points may be stored by the 3D structure DB 130 as the feature point information 131.

FIG. 7 is a diagram useful in explaining one example of the configuration of the camera position/posture information 132. As shown in FIG. 7, the camera position/posture information 132 includes the following three data items "time", "camera position", and "camera posture". The "time" expresses the time at which each record was stored. The "camera position" is a three-dimensional vector showing the position of the camera recognized at each time as the result of the analyzing process. The "camera posture" is a rotational angle vector showing the posture of the camera recognized at each time as the result of the analyzing process. The camera position and posture tracked in this way are used by the content control unit 155, described later, to control behavior of AR content and by the display control unit 160 to control the displaying of AR content.

(4) Marker DB

The marker DB 135 is a database storing information on at least one marker associated with content disposed in the AR space. In the present embodiment, the information stored by the marker DB 135 includes marker basic information 136 and marker detection information 137.

FIG. 8 is a diagram useful in explaining one example of the configuration of the marker basic information 136. As shown in FIG. 8, the marker basic information 136 includes three data items, namely "marker ID", "related content ID" and "size", in addition to a "marker image". The "marker ID" is an identifier for uniquely identifying each marker. The "related content ID" is an identifier for identifying content associated with each marker. The "marker image" is image data of a known marker image used to detect each marker in an input image. Note that in place of a marker image, it is also possible to use a set of feature amounts extracted from each marker image to detect each marker. In the example in FIG. 8, an image in which a lion is drawn is used as the marker image of the marker M01 and an image in which an elephant is drawn is used as the marker image of the marker M02. The "size" expresses the assumed size of each marker image in the real space. Such marker basic information 136 may be stored in advance by the marker DB 135. As an alternative, the marker basic information 136 may be stored in advance by an external server and selectively downloaded to the marker DB 135 in keeping with the position of the image processing apparatus 100 or the object of the provided AR application, for example.

(5) Marker Detecting Unit

The marker detecting unit 140 detects markers present in the real space from the input image. As a specific example, the marker detecting unit 140 extracts feature amounts of the input image and feature amounts of the respective marker images included in the marker basic information 136 in accordance with some kind of feature amount extraction algorithm. The marker detecting unit 140 then matches the extracted feature amounts of the input image against the feature amounts of each marker image. When a marker appears in the input image, this is indicated by a high matching score for the region in which such marker appears. By doing so, the marker detecting unit 140 is capable of detecting a marker that is present in the real space and appears in the input image. As examples, the feature amount extraction algorithm used by the marker detecting unit 140 may be Random Ferns described in "Fast Keypoint Recognition using Random Ferns" (Mustafa Oezuysal, IEEE Transactions on Pattern Analysis and Machine Intelligence, Vol. 32, Nr. 3, pp. 448-461, March 2010) or SURF described in "SURF: Speeded Up Robust Features" (H. Bay, A. Ess, T. Tuytelaars and L. V. Gool, Computer Vision and Image Understanding (CVIU), Vol. 110, No. 3, pp. 346-359, 2008).

In addition, the marker detecting unit 140 estimates the three-dimensional position and posture of a marker in the real space based on the position of the detected marker in the input image (i.e., the two-dimensional position on the image pickup plane) and the marker size and form in the input image. The estimation carried out here may be part of the matching process for feature points described above. The marker detecting unit 140 then outputs the marker ID of the detected marker and also the estimated three-dimensional position and posture of the marker to the marker managing unit 145.

(6) Marker Managing Unit

When a new marker appearing in the input image has been detected by the marker detecting unit 140, the marker managing unit 145 stores the marker ID, the position and posture in the real space, and the detection time of the new marker in the marker DB 135. Also, if a marker that has previously been detected is lost from the input image (due to a reason such as movement that places the marker outside the field of view or the marker being blocked by an obstacle), the marker managing unit 145 may also store a lost time of the marker that has been lost in the marker DB 135.

FIG. 9 is a diagram useful in explaining one example of the configuration of the marker detection information 137 stored by the marker DB 135. As shown in FIG. 9, the marker detection information 137 has five data items, namely "marker ID", "position", "posture", "detection time", and "lost time". The "marker ID" corresponds to the marker ID in the marker basic information 136 illustrated in FIG. 8. The "position" is a three-dimensional vector expressing the estimated position in the real space of each marker. The "posture" is a rotational angle vector expressing the estimated posture of each marker. The "detection time" expresses the time at which each marker was detected. The "lost time" expresses the time at which a marker that has previously been detected stops being detected. In the example in FIG. 9, the lost time L1 is stored for the marker M01. This means that after the marker M01 was detected, the marker M01 was lost from the input image at time L1. Meanwhile, although a detection time D2 is stored for the marker M02, no lost time is stored. This means that after being detected at time D2, the marker M02 continues to appear in the input image as before. The parameters for respective markers that are managed in this way are used by the content control unit 155, described later, to control the behavior of AR content.

(7) Content DB

The content DB 150 is a database storing content information 151 used to control and display at least one AR content item associated with the markers described above.

Figure 10:
FIG. 10 is a diagram useful in explaining one example of the configuration of content information.

FIG. 10 is a diagram useful in explaining one example of the configuration of the content information 151. As shown in FIG. 10, the content information 151 includes a content ID and attributes, and also drawing data. The "content ID" is an identifier that uniquely identifies each AR content item. In the example in FIG. 10, "type" and "control parameter set" are shown as the attributes of the AR content. The "type" is an attribute used to classify the AR content. The AR content may be classified according to a variety of viewpoints, such as the type of associated marker, the type of character expressed by the AR content, or the type of application providing the AR content. The "control parameter set" may include at least one control parameter used to control the behavior of AR content, described later.

In the example in FIG. 10, two types of drawing data, namely "near" and "remote", are defined for each AR content item. As one example, such drawing data is CG (Computer Graphics) data for modeling AR content. The two types of drawing data differ in terms of display resolution. The display control unit 160, described later, switches between which of such drawing data is to be used to display the AR content based on the position or posture of the camera relative to the detected marker.

The content information 151 may be stored in advance in the content DB 150. As an alternative, in the same way as the marker basic information 136 described earlier, the content information 151 may be stored in advance in an external server and selectively downloaded to the content DB 150 in keeping with the position of the image processing apparatus 100 or the object of the provided AR application, for example.

(8) Content Control Unit

The content control unit 155 controls the behavior of AR content associated with a detected marker in the AR space based on at least one of the camera position and the camera posture relative to the detected marker that is being tracked using the marker detection information 137 described above. In the present specification, the expression "behavior of AR content" includes the appearance and removal (disappearance) of AR content in the AR space and movement of the AR content.

(8-1) Appearance of AR Content

When a new marker appearing in the input image has been detected by the marker detecting unit 140 for example, the content control unit 155 has the AR content associated with such new marker in the marker basic information 136 appear in the AR space. The AR content may appear instantly in keeping with detection of the associated marker or may appear when a specified appearance condition has also been satisfied. As one example, the expression "specified appearance condition" may refer to a condition that a distance from the marker to the present camera position is below a specified distance threshold. In such case, even if a marker appears in the input image, the AR content will not appear if the distance from such marker to the camera position is far and the AR content will only appear when the camera position moves closer to the marker. Such distance threshold may be commonly defined for a plurality of AR content items or may be defined as a control parameter for each AR content item.

(8-2) Movement of AR Content

The content control unit 155 moves the AR content in the AR space in accordance with a change in at least one of the position and posture of the camera. For example, the content control unit 155 recognizes an operation such as panning or tilting of the camera by the user from a change in the camera posture (for example, a change in the angle of the optical axis that exceeds a specified amount of change.) As examples, the content control unit 155 may then change the orientation of the AR content in keeping with the panning and move the AR content forward or backward in keeping with the tilting. Note that the mapping between such types of operation and the movement of the AR content is not limited to this example.

If a detected marker has moved outside the field of view of the input image, the content control unit 155 may move the AR content associated with such marker in the AR space so that the AR content is kept within the field of view of the new input image. The three-dimensional position to which the AR content is moved may be decided from the feature point positions stored by the 3D structure DB 130.

If the AR content is an image of a character capable of expressing a line of sight (i.e., looking in a certain direction) such as those illustrated in FIG. 10, it is possible for the content control unit 155 to point the line of sight of the character toward the camera based on the position of the camera relative to the position of the character in the AR space.

(8-3) Removal of AR Content

In the present embodiment, as described earlier, the AR content is not necessarily removed (i.e., does not necessarily disappear) when the associated marker has moved out of the field of view of the input image. However, if AR content endlessly continued to be displayed regardless of the position and posture of the camera, this would conversely appear unnatural to the user. For this reason, in the present embodiment, the content control unit 155 removes AR content if at least one of the camera position and camera posture relative to a detected marker satisfies a specified removal condition. As examples, any of the following conditions A to D or a combination thereof may be used as the specified removal condition.

Condition A: the distance from the marker to the camera position exceeds a specified distance threshold.
Condition B: the angle made between the optical axis of the camera and the direction from the camera to the marker exceeds a specified angle threshold.
Condition C: the time elapsed since the detection time of the marker exceeds a specified time threshold.
Condition D: the time elapsed since the lost time of the marker exceeds a specified time threshold.

The distance threshold, angle threshold, and time thresholds referred to here may be commonly defined for a plurality of AR content items or may be defined as control parameters for each AR content item.

Figure 11:
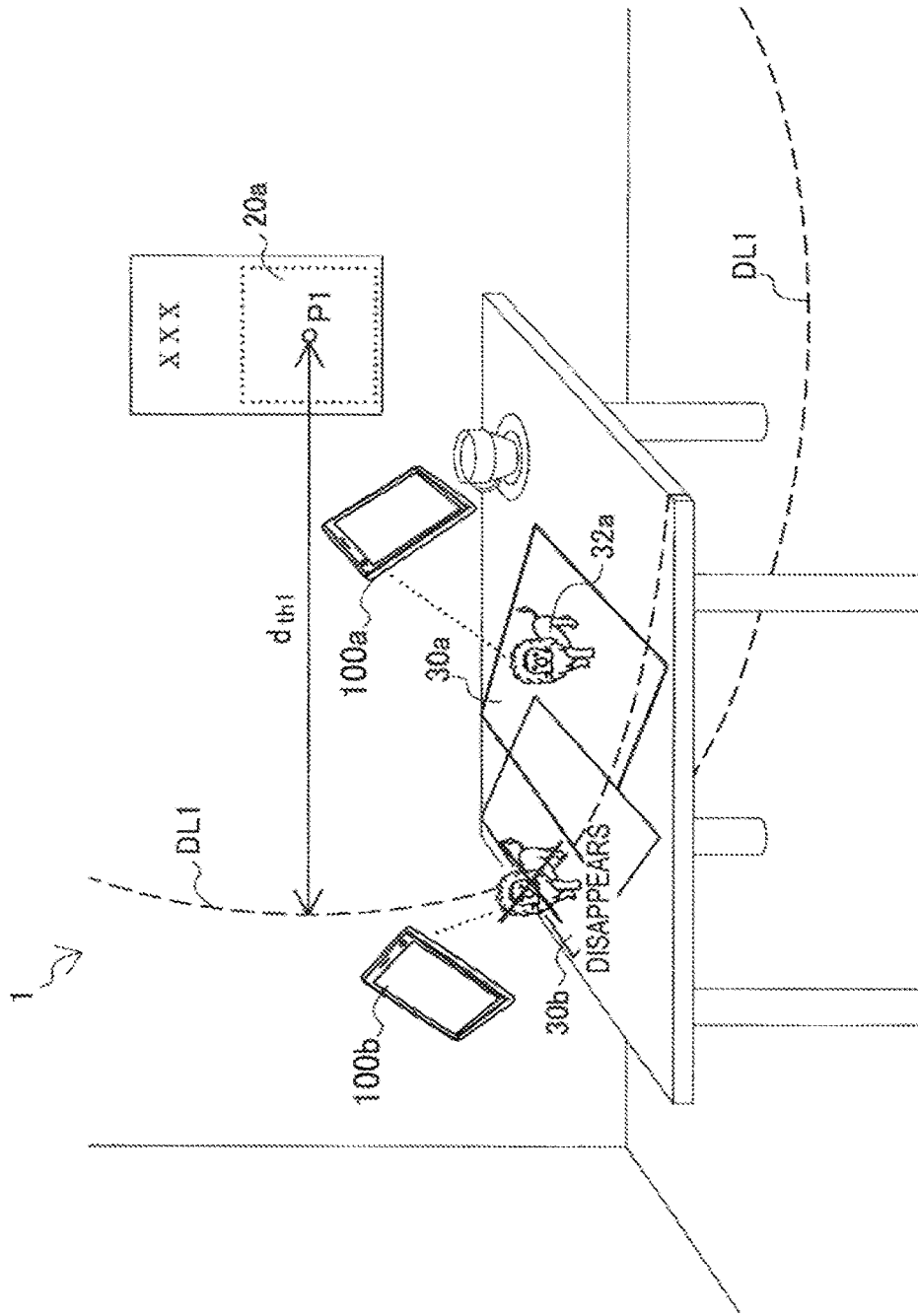
FIG. 11 is a diagram useful in explaining a first example of a removal condition of AR content.

FIG. 11 is a diagram useful in explaining the removal condition A for AR content. In FIG. 11, the real space 1 described earlier is shown again. In FIG. 11, a point P1 is the detection position of a marker 20a and a broken line DL1 shows a boundary where the distance from the point P1 is equal to the distance threshold $d_{th1}$. The distance of an image processing apparatus 100a from the marker 20a is below the distance threshold $d_{th1}$. In this case, the content control unit 155 of the image processing apparatus 100a does not remove the AR content 32a associated with the marker 20a and moves the AR content 32a within a field of view 30a of the image processing apparatus 100a. After this, assume that the apparatus has moved for example from the position of the image processing apparatus 100a to the position of the image processing apparatus 100b. The distance from the marker 20a to an image processing apparatus 100b exceeds the distance threshold $d_{th1}$. In this case, the content control unit 155 removes the AR content 32a associated with the marker 20a. That is, the AR content 32a does not appear in a field of view 30b of the image processing apparatus 100b.

Figure 12:
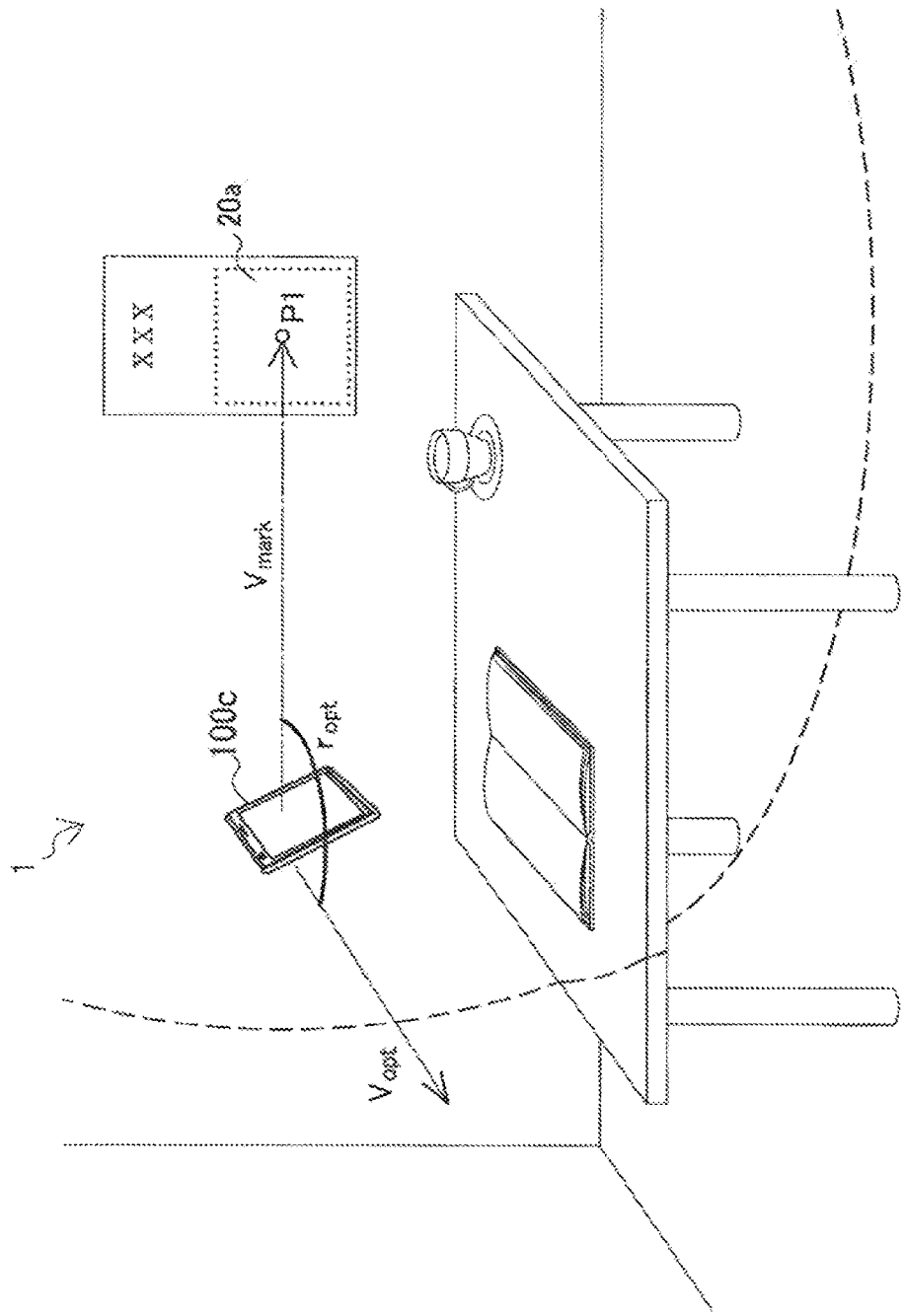
FIG. 12 is a diagram useful in explaining a second example of a removal condition of AR content.

FIG. 12 is a diagram useful in explaining one example of the removal condition B for AR content. In FIG. 12, the real space 1 described earlier is shown again. In FIG. 12, point P1 shows a detection position of the marker 20a. The distance from the marker 20a to an image processing apparatus 100c is assumed to be shorter than the specified distance threshold. However, the angle $r_{opt}$ between the optical axis $V_{opt}$ of the image pickup unit 102 of the image processing apparatus 100c and the direction $V_{mark}$ from the image pickup unit 102 to the marker 20a exceeds a specified angle threshold (not shown). In this case, the content control unit 155 of the image processing apparatus 100c removes the AR content 32a associated with the marker 20a.

Note that regardless of these removal conditions A and B, the content control unit 155 may remove the AR content associated with a marker when, as shown in removal conditions C and D given above, the time elapsed from the detection time of the marker or the time elapsed from the lost time of the marker exceeds a specified time threshold. Also, the AR content associated with a marker may be removed when removal condition A or B is satisfied and the time elapsed from the detection time of the marker or the time elapsed from the lost time of the marker exceeds a specified time threshold.

By controlling the behavior of AR content in this way, an unnatural state where AR content endlessly continues to be displayed regardless of the position and posture of the camera is prevented. Overcrowding of AR content due to the displaying of a large number of AR content items is also avoided. In particular, in the present embodiment, the removal of AR content is controlled in keeping with the position or posture of the camera relative to a marker. This means that it is possible to remove AR content if the user has stopped being interested in such content (for example, if the user has moved away from the marker or is now picking up images in a completely different direction to the marker). That is, the life cycle from appearance to removal of AR content can be appropriately managed in keeping with the state of the user.

(8-4) Coexistence of AR Content

The content control unit 155 may control the coexistence of a plurality of AR content items associated with different markers based on the camera position or posture relative to such markers. For example, the content control unit 155 may select one of the two following control options when a second marker is newly detected in a state where a first AR content item associated with the first marker is already disposed in the AR space.

Option A: dispose the second AR content item associated with the second marker in the AR space in addition to the first AR content item.
Option B: dispose the second AR content item associated with the second marker in the AR space in place of the first AR content item.

As one example, the content control unit 155 may select Option A if the distance from the first marker to the camera position is below a specified distance threshold when the second marker is detected and may select Option B if such distance is above the distance threshold. If Option A is selected, the first and second AR content items will coexist in the AR space. By doing so, as one example it is also possible to express interaction between the AR content items. In particular, in the present embodiment, since the displaying of an AR content item continues even after a marker has been lost from the image, even if a plurality of markers do not simultaneously appear in the input image, it is still possible to gradually add AR content items to the AR space. In this case, it is possible to avoid the coexistence of an excessive number of AR content items in the AR space and to have AR content items coexist in more natural conditions.

Note that the content control unit 155 may control the coexistence of a plurality of AR content items based on the types (for example, the "types" illustrated in FIG. 10) of the first and second AR content items. For example, the content control unit 155 may select Option A described above only when the first and second AR content items are the same type. The expression "AR content items of the same type" may refer for example to AR content items associated with the same type of marker, to AR content items that express the same type of character, or AR content items for an application with the same object. By doing so, it is possible to avoid having a mixture of AR content items that are incapable of interaction coexist with one another.

(8-5) Output of Control Results

By controlling the behavior of AR content in this way, the content control unit 155 selects the AR content to be overlaid on the input image. The content control unit 155 then decides the three-dimensional display position and display posture in the AR space of the selected AR content. The display position and display posture of the AR content are typically decided using the recognition results of the peripheral environment of the image processing apparatus 100 produced by the analyzing unit 125. That is, the content control unit 155 decides the display position and display posture of the AR content using the feature point information 131 and the camera position/posture information 132 stored by the 3D structure DB 130. The display position and display posture of the AR content may be decided so that the AR content is within the field of view of the camera and the respective AR content items stand on an object or on the ground in the field of view. If there is a sudden change in field of view, the display position(s) of the AR content may be decided so that the AR content moves slowly without completely tracking the change in the field of view. Note that the method of deciding the display position and display posture of the AR content is not limited to this example. The content control unit 155 then outputs drawing data, display positions, display postures, and other control parameters for the AR content to be overlaid on the input image to the display control unit 160.

The control parameters additionally outputted from the content control unit 155 to the display control unit 160 may include parameters including the line of sight of an AR content item, for example. Also, the control parameters may include a transparency parameter relating to the fading out of AR content. For example, during the determination of the removal condition A described earlier, the content control unit 155 may set the transparency of an AR content item higher as the distance from the marker to the camera position approaches the specified distance threshold. In the same way, during the determination of the removal condition B described earlier, the content control unit 155 may set the transparency of an AR content item higher as the angle between the optical axis of the camera and the direction from the camera to the marker approaches the specified angle threshold. By setting the transparency in this way, it is possible to have an AR content item gradually fade out before the AR content disappears. The content control unit 155 may also output a control parameter to the display control unit 160 indicating that a graphic indicating is to be displayed when the AR content is about to disappear from the display when one of the removal conditions is satisfied. This control parameter may cause the display to display a graphic indicia instructing a user to adjust the camera position such that a removal condition may no longer be satisfied. This instruction may, for example, be an arrow instructing the user to adjust a position of the camera and/or an instruction to move the camera closer to the marker. The graphic indicia may also simply be a warning indicating that the AR content is about to disappear from the display.

(9) Display Control Unit

The display control unit 160 generates an output image by overlaying the AR content associated with the marker(s) detected by the marker detecting unit 140 on the input image inputted from the image acquiring unit 120. The display control unit 160 then displays the generated output image on the screen of the display unit 110.

More specifically, the drawing data, the display positions, the display posture, and the other control parameters for the AR content to be displayed are inputted from the content control unit 155 into the display control unit 160. The display control unit 160 also acquires the present camera position and posture from the 3D structure DB 130. The display control unit 160 then overlays the AR content at a rendering position on the image pickup plane based on the display position and display posture of the AR content and the present camera position and posture.

The drawing data used for displaying by the display control unit 160 may be switched between the two types of drawing data illustrated in FIG. 10 based on the camera position and camera posture relative to the marker. By doing so, in a state where the user is close to a marker or is picking up images of the periphery of a marker, for example, the content associated with such marker may be displayed with a high display resolution. Also, the display control unit 160 may change the transparency of the AR content in keeping with a control parameter from the content control unit 155.

In the present embodiment, as described earlier, since the display position and display posture of the AR content are decided using the recognition result for the peripheral environment of the image processing apparatus 100, the display control unit 160 is capable, even after a marker that was previously detected has moved out of the field of view of the input image, of overlaying AR content associated with such marker on the input image in a natural way. Also, since the recognition results for the peripheral environment are stored by the 3D structure DB 130, even if recognition of the environment fails for a certain frame, for example, it is possible to continue recognition based on the previous recognition result without having to restart recognition of the environment from the beginning. Therefore, according to the present embodiment, it is possible to continue displaying AR content even if a marker no longer appears in the input image and recognition has temporarily failed. This means that the user can move the camera freely without having to worry about whether markers appear in the input image or whether the peripheral environment is being properly recognized.

2-3. Example Displaying of AR Content

Figure 13A:
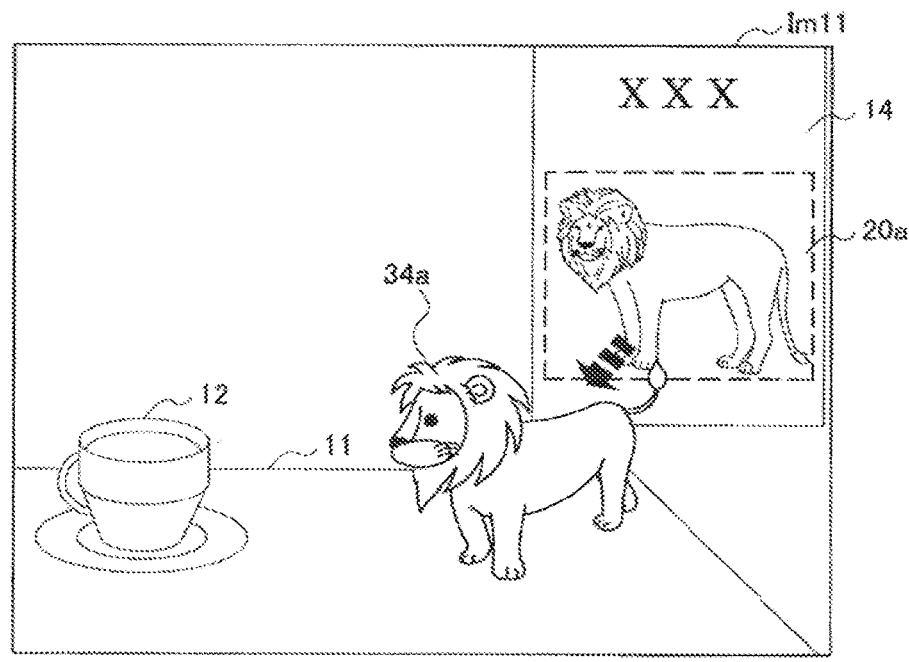
FIG. 13A is a diagram useful in explaining a first example of displaying of AR content according to the present embodiment.

FIG. 13A is a diagram useful in explaining a first example of the displaying of AR content according to the present embodiment. FIG. 13A shows an output image Im11 as one example. The table 11, the coffee cup 12, and the poster 14 appear in the output image IM11. Based on the positions of feature points of such real objects, the analyzing unit 125 of the image processing apparatus 100 recognizes the camera position and camera posture in three dimensions and also the three-dimensional structure (that is, the three-dimensional positions of such feature points) of the environment in accordance with SLAM. The marker 20a is printed on the poster 14. The marker 20a is detected by the marker detecting unit 140 and the AR content 34a associated with the marker 20a is disposed in the AR space by the content control unit 155. As a result, the AR content 34a is displayed in the output image Im11.

Figure 13B:
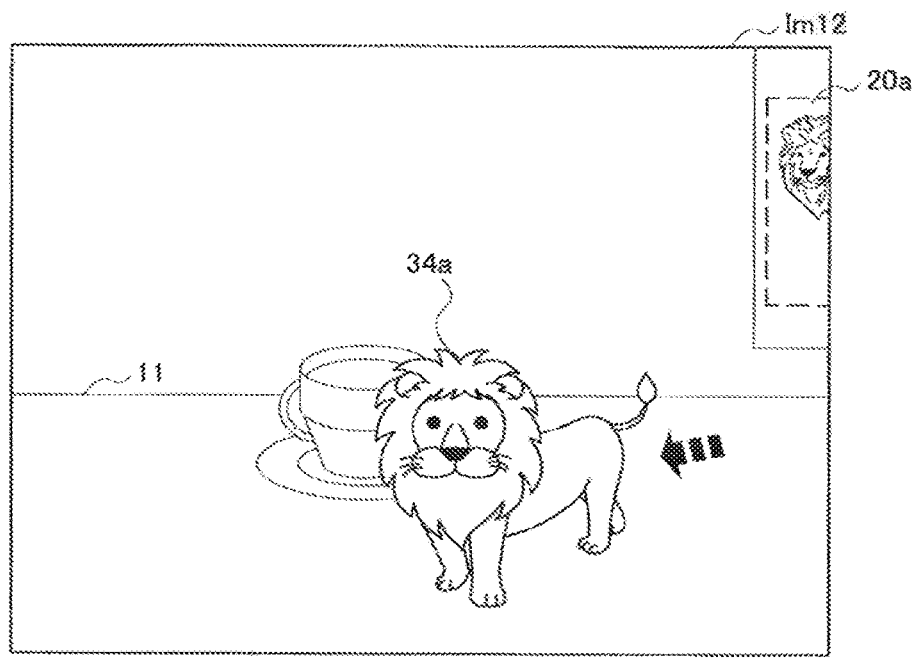
FIG. 13B is a diagram useful in explaining a second example of displaying of AR content according to the present embodiment.

FIG. 13B is a diagram useful in explaining a second example of displaying of AR content according to the present embodiment. An output image Im12 shown in FIG. 13B is an image that may be displayed following the output image Im11 described above. Only part of the poster 14 appears in the output image Im12, so that the marker 20a cannot be detected by the marker detecting unit 140. However, it is assumed that the camera position and camera posture relative to the marker 20a do not satisfy the removal condition described above. The content control unit 155 moves the AR content 34a within the field of view of the output image Im12. The display control unit 160 then overlays the AR content 34a at a position decided based on the camera position/posture information 132 stored in the 3D structure DB 130. After this, if for example the image processing apparatus 100 moves further in a direction away from the marker 20a, the AR content 34a may fade out and finally disappear.

Figure 13C:
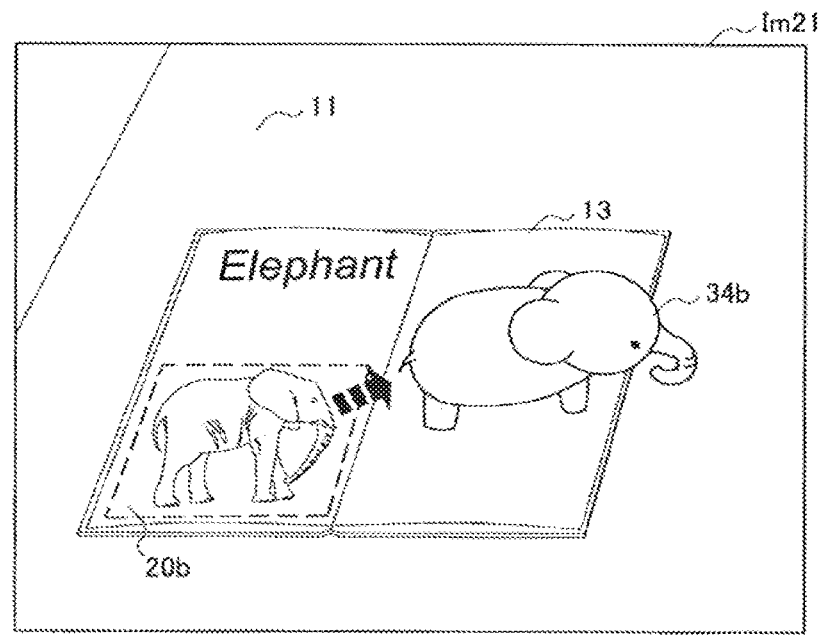
FIG. 13C is a diagram useful in explaining a third example of displaying of AR content according to the present embodiment.

FIG. 13C is a diagram useful in explaining a third example of displaying of AR content according to the present embodiment. FIG. 13C shows an output image Im21 as one example. The table 11 and the book 13 appear in the output image Im21. The analyzing unit 125 of the image processing apparatus 100 recognizes the camera position and camera posture in three dimensions and also the three-dimensional structure of the environment based on the positions of the feature points of such real objects according to SLAM described earlier. The marker 20b is printed on the book 13. The marker 20b is detected by the marker detecting unit 140 and the AR content 34b associated with the marker 20b is disposed in the AR space by the content control unit 155. As a result, the AR content 34b is displayed in the output image Im21.

Figure 13D:
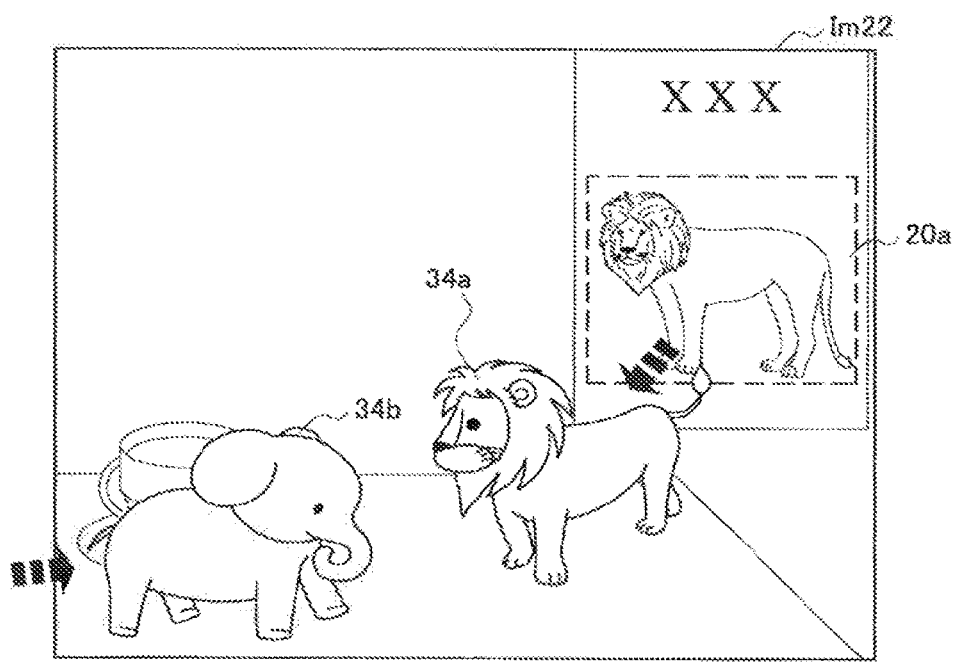
FIG. 13D is a diagram useful in explaining a fourth example of displaying of AR content according to the present embodiment.

FIG. 13D is a diagram useful in explaining a fourth example of displaying of AR content according to the present embodiment. An output image Im22 shown in FIG. 13D is an image that may be displayed following the output image Im21 described above. Although the marker 20b does not appear in the output image Im22, displaying of the AR content 34b is continued. The marker 20a additionally appears in the output image Im22. The marker 20a is detected by the marker detecting unit 140. In the state in FIG. 13D, since the distance from the marker 20b to the camera position is below the specified distance threshold, Option A described above is selected. As a result, the content control unit 155 disposes the AR content 34a associated with the newly detected marker 20a in the AR space in addition to the AR content 34b.

2-4. Flow of Processing

Figure 14:
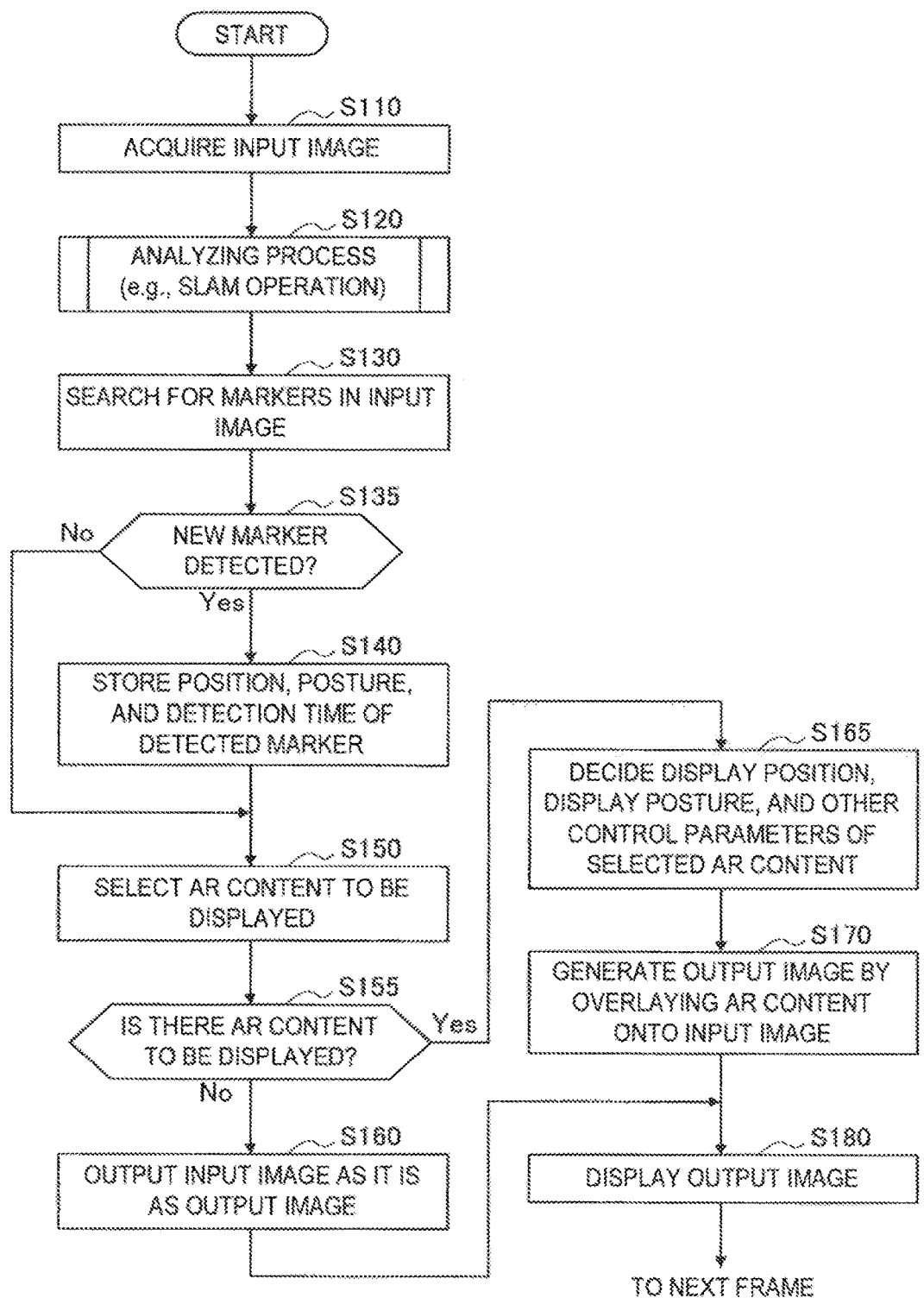
FIG. 14 is a flowchart showing one example of a flow of image processing according to the same embodiment.

FIG. 14 is a flowchart showing one example of the flow of image processing by the image processing apparatus 100 according to the present embodiment.

As shown in FIG. 14, the image acquiring unit 120 first acquires a picked-up image generated by the image pickup unit 102 as an input image (step S110). The image acquiring unit 120 then outputs the acquired input image to the analyzing unit 125, the marker detecting unit 140, and the display control unit 160.

Next, the analyzing unit 125 executes the analyzing process described above on the input image inputted from the image acquiring unit 120 (step S120). The analyzing process executed here may for example correspond to one frame out of the SLAM computation process described with reference to FIG. 5. As a result, the latest three-dimensional camera position and posture and the three-dimensional positions of the new feature points appearing in the input image are stored by the 3D structure DB 130.

After this, the marker detecting unit 140 searches the input image for a marker defined in the marker basic information 136 (step S130). If a new marker has been detected in the input image by the marker detecting unit 140 (step S135), the marker managing unit 145 stores the three-dimensional position and posture and detection time of the new marker in the marker DB 135 (step S140).

Next, the content control unit 155 selects the AR content to be displayed (step S150). The AR content selected here may be markers that do not satisfy the removal condition described earlier out of the markers that have been detected and whose detection times are stored in the marker detection information 137. The process hereafter branches in step S150 according to whether AR content selected by the content control unit 155 is present (step S155).

If no AR content has been selected by the content control unit 155, that is, if there is no AR content to be displayed, the display control unit 160 sets the input image as it is as the output image (step S160). Meanwhile, if there is AR content to be displayed, the content control unit 155 decides the three-dimensional display position and display posture in the AR space of the selected AR content and the other control parameters (for example, the transparency) (step S165). The display control unit 160 then generates the output image by overlaying the AR content on the input image using the decided parameters and the position and posture of the camera (step S170).

The display control unit 160 then displays the generated output image (which may be the same as the input image) on the screen of the display unit 110 (step S180). After this, the processing returns to step S110 and the processing described above may be repeated for the next frame.

3. CONCLUSION

The image processing apparatus 100 according to an embodiment of the present disclosure has been described in detail above with reference to FIGS. 1 to 14. According to the above embodiment, markers associated with AR content to be disposed in an AR space are detected in an input image and information on the position and posture in the real space of each detected marker is managed using a storage medium. The position and posture of the camera relative to the detected marker(s) are tracked and the behavior of the AR content associated with such markers is controlled based on at least one of such position and posture. The laying out of AR content is carried out based on analysis results for the input image using an environment recognition technique such as SLAM. Accordingly, it is possible to continue displaying AR content even after a marker has been lost from the image and to maintain a natural displaying of AR content associated with markers. Note that it is not necessary to manage both the position and posture of detected markers in the real space and only one (for example, only the position) may be managed in a database.

Note that some of the logical functions of the image processing apparatus 100 described earlier may be implemented at an apparatus present in a cloud computing environment instead of being implemented at the image processing apparatus itself. In this case, the information exchanged between the logical functions may be transmitted or received between apparatuses via the communication unit 112 illustrated in FIG. 3.

The series of control processes carried out by the image processing apparatus 100 described in the present specification may be realized by software, hardware, or a combination of software and hardware. Programs that compose such software may be stored in advance for example on a storage medium provided inside or outside the image processing apparatus 100. As one example, during execution, such programs are written into RAM (Random Access Memory) and executed by a processor such as a CPU.

Although a preferred embodiment of the present disclosure has been described above with reference to the attached drawings, the technical scope of the present disclosure is not limited to such embodiment. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing system comprising: one or more processing units that: acquire video data captured by an image pickup unit; detect an object from the video data; detect a condition corresponding to the image pickup unit; and control a display to display content associated with the object at a position other than a detected position of the object based on the condition corresponding to the image pickup unit.

(2) The information processing system of (1), wherein the object detected from the video data is at least one of a shape, symbol, character string, design, object, part of an object and an image displayed on a display.

(3) The information processing system of (1) or (2), wherein detecting a condition corresponding to the image pickup unit includes detecting at least one of a position and posture of the image pickup unit.

(4) The information processing system of (3), wherein the one or more processing units detect at least one of a position and a posture of the detected object.

(5) The information processing system of (4), wherein the one or more processors control the position on the display at which the content is displayed based on the at least one of a position and posture of the image pickup unit and the at least one of a position and a posture of the detected object.

(6) The information processing system of any of (1) to (5), further comprising: a sensor unit that detects the condition corresponding to the image pickup unit.

(7) The information processing system of (6), wherein the sensor unit includes at least one of a positioning sensor, an acceleration sensor and a gyrosensor.

(8) The information processing system of any of (1) to (7), further comprising: a memory that stores information corresponding to at least one object in association with information corresponding to the content.

(9) The information processing system of (8), wherein the information corresponding to the content includes at least one of a marker identifier, a related content identifier and a size corresponding to the content to be displayed.

(10) The information processing system of (8), wherein the one or more processing units acquire the content based on a comparison between the detected object and the information corresponding to the at least one object stored in the memory.

(11) The information processing system of any of (1) to (10), further comprising: a memory that stores at least one of identification information, attribute information and an image corresponding to the content.

(12) The information processing system of (11), wherein the one or more processing units acquire the image corresponding to the content the memory based on the detected object.

(13) The information processing system of any of (1) to (12), further comprising: a memory that stores information corresponding to the detection of the object.

(14) The information processing system of (13), wherein the information corresponding to the detection of the object includes at least one of an object identifier, an object position, an object posture, an object detection time and a time corresponding to when the object was no longer detected in the acquired video data.

(15) The information processing system of (14), wherein the one or more processing units control the position on the display at which the content is displayed based on the condition corresponding to the image pickup unit and the information corresponding to the detection of the object.

(16) The information processing system of any of (1) to (15), wherein the one or more processing units control the display to move the content on the display based on a change in at least one of a position and a posture of the image pickup unit.

(17) The information processing system of any of (1) to (16), wherein the one or more processing units control the display to display the content on the display when the object is no longer detected in the acquired video data.

(18) The information processing system of any of (1) to (17), wherein the detected condition corresponding to the image pickup unit includes at least one of a position and a posture of the image pickup unit, and the one or more processing units control the display to stop displaying the content when at least one of the position and the posture of the image pickup unit satisfies a predetermined condition.

(19) The information processing system of (18), wherein the one or more processing units controls the display to display an indication that the display is to stop displaying the content when at least one of the position and the posture of the image pickup unit satisfies the predetermined condition.

(20) The information processing system of (18), wherein the predetermined condition corresponds to a distance between the image pickup unit and the detected object, and the one or more processing units control the display to stop displaying the content when the distance between image pickup unit and the detected object exceeds a predetermined threshold value.

(21) The information processing system of (18), wherein the predetermined condition corresponds to a difference in an angle between an optical axis of the image pickup unit and an axis extending from the image pickup unit to the detected object, and the one or more processing units control the display to stop displaying the content when the difference in angle exceeds a predetermined threshold value.

(22) The information processing system of (18), wherein the predetermined condition corresponds to a time elapsed from when the object was first detected in the acquired video data, and the one or more processing units control the display to stop displaying the content when time elapsed exceeds a predetermined threshold value.

(23) The information processing system of (18), wherein the predetermined condition corresponds to a time elapsed from when the object was last detected in the acquired video data, and the one or more processing units control the display to stop displaying the content when time elapsed exceeds a predetermined threshold value.

(24) An information processing method performed by an information processing system, the method comprising: acquiring video data captured by an image pickup unit; detecting an object from the video data; detecting a condition corresponding to the image pickup unit; and controlling a display to display content associated with the object at a position other than a detected position of the object based on the condition corresponding to the image pickup unit.

(25) A non-transitory computer-readable medium including computer program instructions, which when executed by an information processing system, cause the information processing system to perform a method, the method comprising: acquiring video data captured by an image pickup unit; detecting an object from the video data; detecting a condition corresponding to the image pickup unit; and controlling a display to display content associated with the object at a position other than a detected position of the object based on the condition corresponding to the image pickup unit.

REFERENCE SIGNS LIST

1 Real space
20a, 20b, 20c Marker (object)
100 Image processing apparatus
120 Image acquiring unit
125 Analyzing unit
140 Detecting unit
145 Managing unit
155 Content control unit
160 Display control unit

The invention claimed is:

1. An information processing system, comprising:
circuitry configured to
receive a captured image including a real object in a physical environment,
receive at least one of detected three-dimensional position information and posture information of a camera relative to the real object,
initiate to a display an appearance of an augmented reality (AR) object based on the real object, and
control the display to continue displaying the AR object associated with the real object when the real object in the physical environment is no longer detected on the display based on the detected information.

2. The information processing system of claim 1, wherein the circuitry is further configured to detect a status of the information processing system.

3. The information processing system of claim 2, wherein the circuitry is further configured to control an appearance of the AR object based on the status of the information processing system.

4. The information processing system of claim 2, wherein the circuitry is further configured to control a movement of the AR object based on the status of the information processing system.

5. The information processing system of claim 1, wherein the AR object appears in response to a condition being satisfied.

6. The information processing system of claim 5, wherein the condition is determined based on a three-dimensional position and a posture of at least one imaging device relative to the detected three-dimensional position information and the posture information.

7. The information processing system of claim 1, wherein the circuitry is further configured to
control the display to continue displaying the AR object associated with the real object when the real object is partially observable on the display.

8. The information processing system according to claim 1, wherein a position of the AR object is decided based on feature point positions of an environment of the information processing system.

9. The information processing system according to claim 8, wherein the feature point positions are recognized by using simultaneous localization and mapping (SLAM).

10. A method, comprising:
receiving, by processing circuitry, an image captured by an imaging device including a real object in a physical environment;
receiving, by the processing circuitry, at least one of detected three-dimensional position information and posture information of a camera relative to the real object;
controlling, by the processing circuitry, display of an appearance of an augmented reality (AR) object based on the real object; and
controlling, by the processing circuitry, a display to continue displaying, on the display, the AR object associated with the real object in a case that the real object in the physical environment is no longer detected on the display based on the detected information.

11. The method of claim 10, further comprising:
detecting a status of an information processing system.

12. The method of claim 11, further comprising:
controlling an appearance of the AR object based on the status of the information processing system.

13. The method of claim 11, further comprising:
controlling a movement of the AR object based on the status of the information processing system.

14. The method of claim 10, further comprising:
displaying the AR object in response to a condition being satisfied.

15. The method of claim 14, further comprising:
determining the condition based on a three-dimensional position and a posture of the imaging device relative to the detected three-dimensional position information and the posture information.

16. The method of claim 10, further comprising:
controlling the display to continue displaying the AR object associated with the real object in a case that the real object is partially observable on the display.

17. A non-transitory computer-readable storage medium storing computer-readable instructions thereon which, when executed by a computer, cause the computer to perform a method, the method comprising:
receiving, by processing circuitry, an image captured by an imaging device including a real object in a physical environment;
receiving, by the processing circuitry, at least one of detected three-dimensional position information and posture information of a camera relative to the real object;
controlling, by the processing circuitry, a display of an appearance of an augmented reality (AR) object based on the real object; and controlling, by the processing circuitry, the display to continue displaying, on the display, the AR object associated with the real object in a case that the real object in the physical environment is no longer detected on the display based on the detected information.

18. The non-transitory computer-readable storage medium of claim 17, further comprising:
   detecting a status of an information processing system;
   controlling an appearance of the AR object based on the status of the information processing system; and
   controlling a movement of the AR object based on the status of the information processing system.

19. The non-transitory computer-readable storage medium of claim 18, further comprising:
   displaying the AR object in response to a condition being satisfied.

20. The non-transitory computer-readable storage medium of claim 19, further comprising:
   determining the condition based on a three-dimensional position and a posture of an imaging device relative to the detected three-dimensional position information and the posture information.

21. The non-transitory computer-readable storage medium of claim 17, further comprising:
   controlling the display to continue displaying the AR object associated with the real object in a case that the real object is partially observable on the display.

* * * * *